Figure 1:
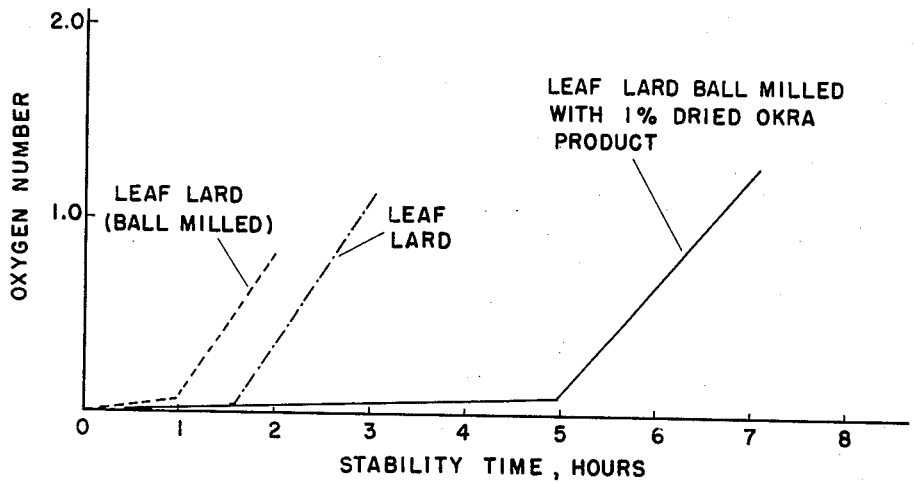

Aug. 30, 1960

L. R. B. HERVEY 2,950,975

ANTI-OXIDANT AND COMPOSITIONS CONTAINING THE SAME

Filed July 21, 1958

*INVENTOR.*
LAURENCE R. B. HERVEY

BY
ATTORNEY

United States Patent Office

2,950,975
Patented Aug. 30, 1960

2,950,975

ANTI-OXIDANT AND COMPOSITIONS CONTAINING THE SAME

Laurence R. B. Hervey, West Concord, Mass., assignor, by mesne assignments, to John A. Manning Paper Company, Inc., Troy, N.Y., a corporation of New York Filed July 21, 1958, Ser. No. 750,045

7 Claims. (Cl. 99—163)

This invention relates to anti-oxidants and more particularly to anti-oxidants suitable for ordinarily oxidizable fats and oils.

Edible fats and foods containing them are readily subject to oxidation. This means that such fats or fat-containing foods become rancid which in turn lessens the palatability of the food and impairs the nutritive values of the food. Moreover, oxidation of foods destroys their flavor, imparts to them an unwanted odor, and in the process of the oxidation reaction may even produce products which are toxic.

Many methods of combating unwanted oxidation are known including refrigeration, the use of special methods of food preparation, the use of special wrapping and packaging techniques, and most recently the addition of small amounts of materials known generally as anti-oxidants which are designed to inhibit oxidation.

Anti-oxidants for food use must of course be non-toxic in addition to being effective inhibitors of oxidation. This requirement has indicated the desirability of developing anti-oxidants derived from natural sources. Such naturally derived anti-oxidants have included norconedendron extracted from the western hemlock, dihydroquercetin extracted from Douglas fir and Jeffrey pine, and sesanol from sesame oil. The toxicity of some of these is in doubt and although they may be effective in extending the keeping time of fats, none of them has shown the property of "carry-through," i.e., the ability to retard development of rancidity in foods made with fats such as pastry and crackers.

In addition to the anti-oxidants extracted from naturally occurring materials many synthetic anti-oxidants are now known. Although many of these are effective in inhibiting oxidation, they all carry with them the possibility of being toxic and it sometimes requires years to prove whether or not they are actually harmful for human consumption.

It would therefore be desirable to have an anti-oxidant which is derived from a natural source known to be completely non-toxic and which can serve as an effective inhibitor of oxidation for an extended period of time. In addition, it is desirable for such an anti-oxidant to exhibit the required carry-through property in foodstuffs containing fats.

It is therefore an object of this invention to provide an anti-oxidant made from a vegetable which is non-toxic and which is at the same time effective in inhibiting the oxidation of fats and fat-containing foods.

It is another object to provide an anti-oxidant which may be used in small quantities and which does not detract from the taste, odor, or general palatability of edible fats and foods containing them. These and other objects will become apparent in the following discussion.

The anti-oxidant which has been found to achieve the above listed objects is a dry material prepared by dehydrating the mucilage-producing content of okra pods. The okra product (hereinafter referred to as "dried okra product") which is suitable for the practice of this invention is a dry powder extracted from okra pods by any suitable process which permits removal of the water, subsequent drying and isolation of the mucilage-producing material contained in the pods. The dried okra product is preferably prepared by a process which reduces the alcohol-soluble materials content to less than 0.8% based on the total weight of the dried okra product, and which as a final step gives a material preferably at least 60% of the individual particles of which are in a size range from 45 to 75 microns.

One such process comprises dehydrating and precipitating the mucilage-producing material of okra pods by means of an organic dehydrating agent such as one of the lower alcohols, and drying the resulting dehydrated and precipitated material under conditions which will not degrade the final dried okra product.

Another process by which dried okra product may be prepared achieves the extraction of the mucilage-producing material of the okra pod by a form of steam distillation using a water-immiscible hydrocarbon.

In any process employed to produce the dried okra product required in the process of this invention, it is preferable that the temperatures and times of processing are such as not to render the final product unstable or degraded with respect to its mucilage-producing abilities.

Although the reasons why dried okra product is or is not stable are not understood, it appears that the enzymatic activity associated with the naturally occurring pods must be substantially and rapidly arrested to prevent subsequent degradation of the final product.

Figure 2:
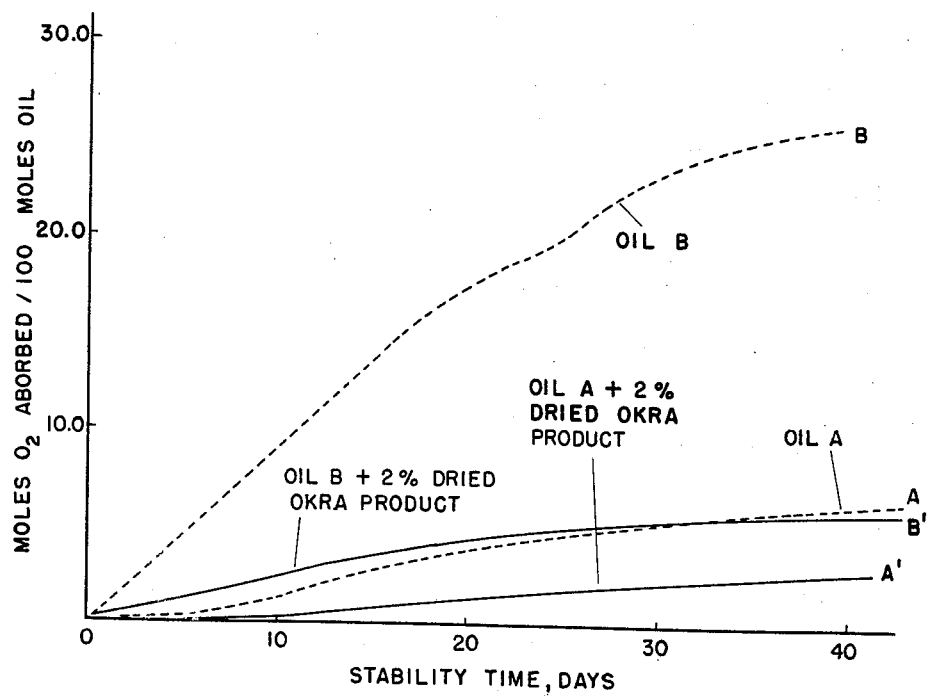

The use of the okra product as an anti-oxidant according to the practice of this invention may be more clearly illustrated with reference to the accompanying drawings in which:

Fig. 1 is a plot of the oxidation of two controls of leaf lard without an anti-oxidant, and with dried okra product; and Fig. 2 is a plot of the oxidation of peppermint oil with and without dried okra product.

The following examples, which are meant to be illustrative and not limiting, are given to illustrate the unexpected effect which dried okra product has as an inhibitor of oxidation.

*Example I*

Samples of pure leaf-lard containing no anti-oxidant and containing dried okra product in several concentrations were evaluated to determine their stability in an oxygen atmosphere. The dried okra product used was prepared by dehydrating and precipitating the mucilage-producing portion of okra pods in isopropyl alcohol.

It was found preferable to incorporate the dried okra product by ball milling it for about 4 hours into the leaf lard. Since the effect of ball milling leaf lard on its stability was not known, two controls without dried okra product (one ball milled for 4 hours, the other not) were run. The results showing the stability of the controls and of leaf lard containing 1% by weight dried okra product are plotted in Fig. 1.

These evaluations were made by confining a known weight of the lard in an atmosphere of pure oxygen at 100° C. The entire system was kept in constant agitation to assure equilibrium between the lard and oxygen. At predetermined intervals, the volume of oxygen in the system was measured by means of a mercury manometer directly attached to the system. The measurement recorded directly the volume of oxygen consumed by the lard during the process of oxidative rancidification and these volume measurements were converted to volume of oxygen consumed per gram of lard. These converted measurements are plotted in Fig. 1. It will be noted in this figure that the curves break quite sharply and the lard then consumes oxygen at a very rapid rate. The intersection of the slopes of each leg of the curve is considered to be the end point for oxygen stability time, in hours, of the lard at 100° C.

From Fig. 1 it will be seen that the stability time for the leaf lard which had been ball milled is about one hour while that for the lard which had not been ball milled is somewhat less than two hours. In contrast to these figures the sample of lard which contained 1% dried okra product had a stability time of between 5 and 6 hours.

Experience has indicated that one hour of stability time measured in the above-described method is roughly equivalent to 3 hours' stability time using the Active Oxygen Method (AOM) at an equivalent temperature. Thus the lard which had been ball milled would have approximately 3 hours AOM time; lard which had not been ball milled would have about 5 hours AOM time; while lard containing 1% dried okra product would have something over 15 hours AOM time. It will be seen from these performance figures that 1% dried okra product has the effect of multiplying the stability time of leaf lard by a factor of about 5 if the leaf lard is ball milled, and by a factor of 3 if the leaf lard is not ball milled.

Similar tests were repeated using 0.1%, 0.5 and 2% dried okra product in the leaf lard. The results of these tests show that the anti-oxidant properties of the dried okra product increases with increasing amounts of the additive up to about 1% by weight. Although there is some increase in stability time when 2% is used instead of 1%, this increase is slight and drops off significantly above about 4%. Quantities of dried okra product less than about 0.1%, although they show some anti-oxidant properties, are not considered feasible. A useable range is therefore between about 0.1% and 4% dried okra product based on the weight of the leaf lard; a practical range is between about 0.5% and 1% dried okra product.

*Example II*

In a somewhat similar manner the effect of adding dried okra product to peppermint oil was measured. In this case two different samples of peppermint oil were used and dried okra product was added in a concentration of 2% by weight. The samples with and without the dried okra product were placed in a Warburg apparatus and subjected to an atmosphere of oxygen. The samples were continuously agitated and the uptake of oxygen measured by the drop in oxygen pressure as measured on a manometer. The study was carried out over a period of 38 days and the results are plotted in Fig. 2 where the moles of oxygen absorbed per 100 moles of peppermint oil are plotted against time.

In Fig. 2 curve A represents one lot of peppermint oil without dried okra product and curve A' represents the same lot of peppermint oil containing 2% by weight of dried okra product. Likewise curve B represents an extremely fast-oxidizing peppermint oil without dried okra product while curve B' represents the same oil containing 2% dried okra product.

After 38 days oil A without dried okra product had absorbed 6.4 moles of oxygen per 100 moles of oil while with dried okra product this was reduced to 3.2 moles or one-half. Over a similar period of time oil B without dried okra product absorbed 25.8 moles of oxygen per 100 moles of oil while that containing the dried okra product, B', absorbed 6.4 moles of oxygen per 100 moles of oil. This means that the amount of oxygen absorbed in the presence of dried okra product was reduced to about one-fourth that absorbed when no dried okra product was added.

Inasmuch as peppermint oil is known to be one of the most easily oxidized oils, it can be concluded that the okra product is an extremely effective anti-oxidant under even the most stringent conditions.

As in the case of leaf lard, the quantity of dried okra product which may be added to substances to inhibit oxidation in them may vary from about 0.1% to about 4% by weight of the substance while a preferable range is between 1% and 2% by weight.

The dried okra product may be added as a dry flour-like material to the substance to be protected or it may be throughly mixed into a small quantity of the material by any suitable technique, such as the ball milling procedure used in the examples, and then added as a concentrated suspension or dispersion to the remaining portion of the material.

From the above discussion and description of this invention it will be seen that there is provided an anti-oxidant capable of inhibiting the oxidation of edible oils and fats, whether of animal or vegetable derivation. A very important feature of the anti-oxidant of this invention is the fact that it is derived from an edible vegetable known as a food for thousands of years.

I claim:

1. As a new composition of matter, a normally oxidizable fat-containing material including therein a minor amount of a dried extract of the mucilage-producing portion of okra pods.

2. Composition of matter in accordance with claim 1 wherein said extract is present in concentrations ranging from about 0.1% to about 4% by weight of said oxidizable material.

3. As a new composition of matter, a normally oxidizable fat-containing material including therein up to 4% by weight of a dried extract of the mucilage-producing portion of okra pods, said extract containing not more than 0.8% alcohol soluble materials content and at least 60% of the individual particles of said extract ranging in size from 45 to 75 microns.

4. As a new composition of matter, a normally oxidizable, edible, fat-containing material including therein a minor amount of a dried extract of the mucilage-producing portion of okra pods.

5. Composition of matter in accordance with claim 11 wherein said extract is present in concentrations ranging from about 0.1% to about 4% by weight of said edible fat-containing material.

6. Process of inhibiting the oxidation of a normally oxidizable fat-containing material, characterized by the step of adding to such material a minor quantity of a dried extract of the mucilage-producing portion of okra pods.

7. Process of inhibiting the oxidation of an edible, normally oxidizable fat-containing material, comprising the steps of incorporating a dried extract of the mucilage-producing portion of okra pods into a small quantity of said oxidizable material to form a concentrated dispersion of said extract and adding said dispersion to an additional quantity of said oxidizable material, the final concentration of said extract ranging from about 0.1% to about 4% by weight of said oxidizable material.

References Cited in the file of this patent
UNITED STATES PATENTS
2,204,729    Ellis et al. _____ June 18, 1940

UNITED STATES PATENT OFFICE

CERTIFICATE OF CORRECTION

Patent No. 2,950,975                                    August 30, 1960

Laurence R. B. Hervey

It is hereby certified that error appears in the printed specification of the above numbered patent requiring correction and that the said Letters Patent should read as corrected below.

Column 4, line 46, for the claim reference numeral "11" read -- 4 --.

Signed and sealed this 4th day of April 1961.

(SEAL)
Attest:

ERNEST W. SWIDER

Attesting Officer

ARTHUR W. CROCKER
Acting Commissioner of Patents